United States Patent [19]

Suga

[11] 4,025,440

[45] May 24, 1977

[54] DEVICE FOR REGULATING A XENON LAMP WITH OPTICAL AND TEMPERATURE COMPENSATION

[76] Inventor: Shigeru Suga, Yoyogi 5-20-2, Shibuya, Tokyo, Japan

[22] Filed: May 4, 1976

[21] Appl. No.: 683,216

[30] Foreign Application Priority Data

Sept. 30, 1975 Japan .......................... 50-132980
Oct. 30, 1975 Germany .......................... 2548635

[52] U.S. Cl. .......................... 250/205; 250/214 C; 250/227; 315/151

[51] Int. Cl.[2] .......................... G01J 1/32

[58] Field of Search .......... 250/205, 238, 239, 227, 250/214 C; 315/151

[56] References Cited

UNITED STATES PATENTS 3,336,481 8/1967 Nelson .......................... 250/238
3,734,632 5/1973 Matsuda .......................... 250/214 C
3,872,301 3/1975 Joppich .......................... 250/205

*Primary Examiner*—David C. Nelms
*Attorney, Agent, or Firm*—Wenderoth, Lind & Ponack

[57] ABSTRACT

A temperature compensating device for use in regulating the voltage to a lamp in a lightfastness tester. The device includes a plurality of aluminum-coated glass rods adjacent the lamp for transmitting the light produced by the lamp to a light-receiving element, such as a photoelectric cell. A heat-sensitive resistance is electrically connected to the light-receiving element and compensates for changes in temperature of the light-receiving element. An electric circuit is combined with the light-receiving element and the resistance to receive the temperature adjusted voltage from the light-receiving element and the resistance and to compare that voltage with a reference voltage. In turn, the voltage to the xenon lamp is adjusted based on the difference between the two compared voltages.

8 Claims, 4 Drawing Figures

DEVICE FOR REGULATING A XENON LAMP WITH OPTICAL AND TEMPERATURE COMPENSATION

The present invention relates to a regulating device which at all times keeps the quantity of light from a xenon lamp constant, such xenon lamps being used primarily in weathermeters, fademeters and other lightfastness testing devices. In particular, the present invention relates to a regulating device having an improved compensating circuit and an improved light-introducing section.

BACKGROUND OF THE INVENTION

The xenon lamps used as a light source in weathermeters, fademeters and lightfastness testing devices in general suffer degradation with use and gradually diminish in the quantity of light they produce. This is unfortunate, because maintaining the quantity of light constant at all times for the purpose of conducting these tests is desirable.

Japanese Utility Model Applications Nos. 47-021182, 47-021183 and 50-058384, filed by the Applicant of the present application, disclose methods of recovering energy at a constant rate by incorporating a temperature difference radiometer and other light-receiving elements into the testing apparatus in order to adjust the voltage applied to the xenon lamp by means of a control circuit based on the output of said light-receiving element.

Such methods, however, do not consider compensating for the temperature of the light-receiving end; and therefore, the surrounding temperature of the light-receiving element rises due to the element's absorption of light. Furthermore, when optical fibers are used, the degradation in the weatherability of the coating material also affects the device, despite the fact that optical fibers are designed so as not to produce light losses by utilizing a different reflective index between the coating material and the fiber.

A temperature change of 10° C caused by the aforesaid effects corresponds to a change in light quantity of about 10%, and results in a halving of the light-introducing efficiency within 1 to 2 years.

BRIEF SUMMARY OF PRESENT INVENTION

It is, therefore, an object of the present invention to overcome these deficiencies in the prior art by providing a device which compensates for the temperature changes of the light-receiving element in regulating the voltage transmitted to the xenon lamp, so that a constant quantity of light is continuously produced by the lamp, regardless of the increase in temperature of the light-receiving element due to absorption of light.

The device includes a plurality of aluminum-coated glass rods adjacent the lamp for transmitting the light produced by the lamp to a light-receiving element, such as a photoelectric cell. A heat-sensitive resistance is electrically connected to the light-receiving element and compensates for changes in temperature of the light-receiving element. An electric circuit is combined with the light-receiving element and the resistance to receive the temperature-adjusted voltage from the light-receiving element and the resistance and to compare that voltage with a reference voltage. In turn, the voltage to the xenon lamp is adjusted based on the difference between the two compared voltages.

BRIEF DESCRIPTION OF THE DRAWINGS

Other objects and advantages of the invention will become apparent from the following detailed description taken with reference to the accompanying drawings, in which.

DETAILED DESCRIPTION OF THE INVENTION

Figure 1:
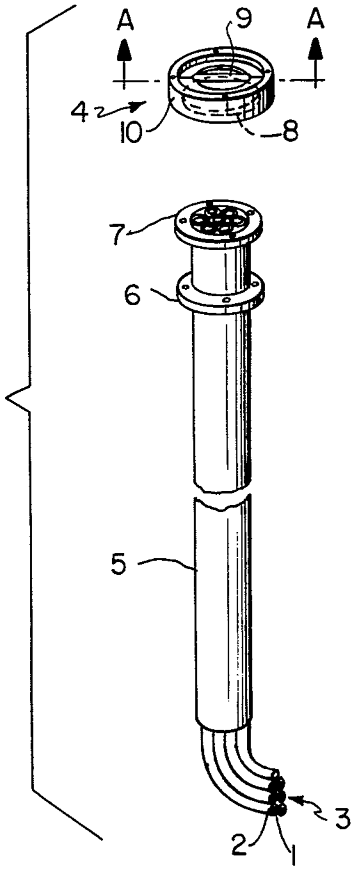
FIG. 1 is a view of the light-introducing and light-receiving sections of the regulating device of the present invention.

Referring to FIG. 1, the light-introducing section of the present invention is comprised of a bundle of glass rods 1 of a diameter of 2 to 3 mm, one end of each rod being smoothly bent at a right angle. The surfaces of the rods have an aluminum coating 2 vacuum-deposited thereon. The aluminum coating 2 serves to reflect the light which has entered from the light-incident end 3 and guides the light, which tends to scatter, to a light-receiving end 4. A plurality of these rods 1 are bundled together and contained within a pipe 5. After the rods 1 are inside the pipe 5, the pipe is filled with a filler compound, such as methacrylic polymer and monomer, to bond the rods 1 together and to hold the rods 1 inside the pip 5. A flange 6 is attached near the top end of the pipe 5 to mount it onto the upper part of the testing chamber of a fademeter or weathermeter. A second flange 7 is provided to connect the pipe 5 to the light receiving end 4.

Referring to the light-receiving end 4, a light-receiving element 8, such as of a silicon photocell, and a heat-sensitive resistance 9 for temperature compensation are attached to a mounting plate 10 by adhesive or the like. The heat-sensitive resistance 9 is placed near the back side of the light-receiving element 8 where light is not irradiated. The light-receiving element 8 and the heat-sensitive resistance 9 are connected to an electric circuit as shown in FIG. 3.

Figure 3:
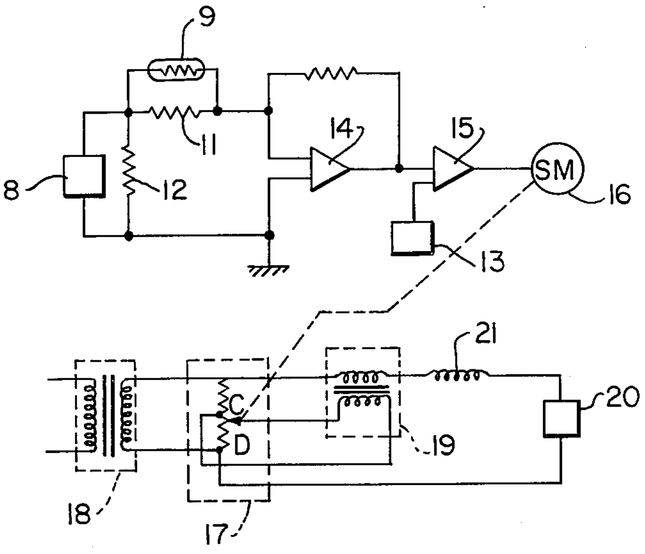
FIG. 3 is an electric circuit diagram for compensating temperatures and controlling the quantity of the light produced.
Figure 2:
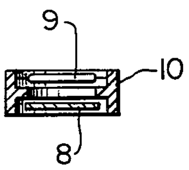
FIG. 2 is a sectional view of the light-receiving section taken along line A—A of FIG. 1.

FIG. 3 shows an electric circuit in which the light-receiving element 8 (silicon photocell) and the heat-sensitive resistance 9 for temperature compensation are connected. When the silicon photocell 8 has a positive temperature characteristic, whereby the output increases with an increase in temperature, the heat-sensitive resistance 9 should also have a positive temperature characteristic, and when the silicon photocell 8 has a negative temperature characteristic, output decreases with an increase in temperature, the heat-sensitive resistant 9 should have a negative temperature characteristic. Resistances 11, 12 in the circuit are adjusted to fit within the required temperature compensation range. By so arranging the circuit, the output of the photocell 8 and the heat-sensitive resistance 9 is amplified by an amplifier 14, is compared with a reference voltage 13, and is connected to a servo amplifier 15 and a servo motor 16. When the amplified output is different than the reference voltage, the servo motor 16 engages so that the quantity of light produced by the xenon lamp will correspond to the reference voltage. When it is desired to change the quantity of light, the reference voltage may be varied. A voltage regulator 17 is connected to the servo motor 16, to the secondary side of an input transformer 18, and, at one end D thereof, is connected to the xenon lamp 20. The middle point C of the voltage regulator 17 and a slide piece are connected to the secondary side of a secondary transformer 19. One end of the secondary transformer 19 is also connected to the xenon lamp 20. The voltage of the secondary transformer 19 fitted to the voltage regulator 17 is added to the voltage of the input transformer 18; the supply voltage to the xenon lamp is, thereby, controlled to keep the quantity of light from the xenon lamp constant. A reactance 21 is also provided in the circuit to maintain the current through the xenon lamp within a stabilized range.

Figure 4:
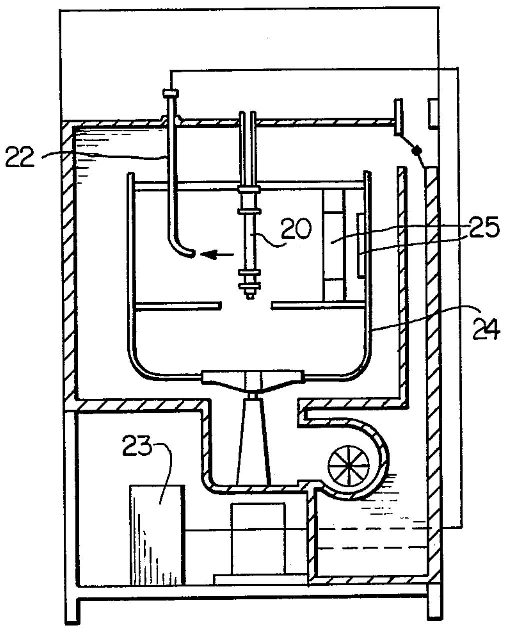
FIG. 4 is a diagram showing the present invention as installed in a weathermeter.

FIG. 4 shows an embodiment in which the device of the present invention is installed in a weathermeter, and in which the numeral 22 represents the light-introducing section; 20 is a xenon lamp which is to be controlled; and 23 is an electric circuit such as a transformer voltage regulator.

A rotating frame 24 rotates samples about the lamp 20. Each sample 25 is irradiated with the light from the xenon lamp 20 and is subjected to weather-proof testing.

The lamp 20 suffers degradation over long periods of use. As the quantity of light is reduced, the aforesaid quantity of light adjustment is effected to maintain the initial reference quantity of light, whereby testing is conducted under conditions of steady light quantity. Futhermore, according to the present invention, the light-introducing part 3 is not degraded and remains stable, making it possible to perform compensation effectively regardless of temperature changes in the testing apparatus and surroundings.

It will be apparent that various modifications may be made to the above specifically described structural arrangements without departing from the scope of the invention.

What is claimed is:

1. A device for regulating the quantity of light emitted from a lamp in a lightfastness testing device, said device comprising:

a plurality of individually aluminum-coated glass rods bundled together, said bundled rods having a light-incident end adjacent said lamp and a light-receiving end opposite said light-incident end;

light-receiving means attached to said light-receiving end of said glass rods for receiving the light from said lamp transmitted through said glass rods and for generating a temperature adjusted voltage in response thereto, said light-receiving means comprised of:

a light-receiving element for generating a current in response to the light received from said lamp, and a heat-sensitive resistance electrically connected to said light-receiving element for compensating for changes in the characteristics of said light-receiving element caused by temperature; and electric circuit means having a reference voltage, said circuit means connected between said light-receiving means and said lamp for comparing the voltage generated by said light-receiving means with said reference voltage and for regulating the voltage to said lamp in response to the difference between voltage generated by said light-receiving means and said reference voltage.

2. A device as claimed in claim 1 wherein said electric circuit means having a reference voltage is further comprised of:

an amplifier connected to said light-receiving means for amplifying the voltage produced thereby, whereby a first amplified signal is produced, a servo amplifier connected to said reference voltage and said amplifier for comparing said first amplified signal and said reference voltage and producing a second amplified signal, a servo motor connected to said servo amplifier and actuated and regulated thereby and connected to said lamp for regulating the amount of voltage to said lamp in response to said servo motor.

3. A device as claimed in claim 1 wherein said light-receiving element is a photoelectric cell.

4. A device as claimed in claim 1 further comprising a pipe surrounding said bundled plurality of glass rods.

5. A device as claimed in claim 4 further comprising filler means in said pipe for bonding said glass rods together and for holding said glass rods in said pipe.

6. A device as claimed in claim 5 wherein said filler means is comprised of methacrylic polymer.

7. A device as claimed in claim 5 wherein said filler means is comprised of methacrylic monomer.

8. A device as claimed in claim 1 wherein said heat-sensitive resistance is positioned out of the light transmitted through said glass rods.

* * * * *